(12) United States Patent
Kim et al.

(10) Patent No.: US 7,577,968 B2
(45) Date of Patent: Aug. 18, 2009

(54) OPTICAL PICKUP ACTUATOR, METHOD OF MANUFACTURING THE OPTICAL PICKUP ACTUATOR, AND OPTICAL PICKUP EMPLOYING THE OPTICAL PICKUP ACTUATOR, AND OPTICAL RECORDING AND/OR REPRODUCING APPARATUS EMPLOYING THE OPTICAL PICKUP

(75) Inventors: Seok-jung Kim, Suwon-si (KR); Jung-gug Pae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 11/154,808

(22) Filed: Jun. 17, 2005

(65) Prior Publication Data

US 2005/0281147 A1    Dec. 22, 2005

(30) Foreign Application Priority Data

Jun. 22, 2004   (KR)   ............... 10-2004-0046652

(51) Int. Cl.
G11B 7/08 (2006.01)
(52) U.S. Cl. .................................................. 720/681
(58) Field of Classification Search ................ 720/681, 720/683, 689, 600, 675, 660, 672, 676
See application file for complete search history.

(56) References Cited

U.S. PATENT DOCUMENTS 6,430,113 B1 *  8/2002  Takishima ................. 369/13.2

(Continued)

FOREIGN PATENT DOCUMENTS

CN   1336644 A   2/2002

(Continued)

OTHER PUBLICATIONS

Search Report issued on Dec. 29, 2006 by the European Patent Office for European Patent Application No. 05253612.5.

(Continued)

*Primary Examiner*—Allen T Cao
(74) *Attorney, Agent, or Firm*—Stein McEwen, LLP

(57) ABSTRACT

An optical pickup actuator including a blade supported by a plurality of suspensions to be movable with respect to a base and a magnetic circuit to drive a movable part including the blade, a method of manufacturing the optical pickup actuator, an optical pickup employing the optical pickup actuator, and an optical recording and/or reproducing apparatus employing the optical pickup. The movable part includes a weight center adjusting element of the movable part in order to induce a radial rolling operation in a direction in which an optical axis of an objective lens is perpendicular to an information storage surface of an information storage medium, during a focusing operation in a high frequency band above the first resonant frequency of the optical pickup actuator. The method of manufacturing the optical pickup actuator includes checking the direction of radial rolling for each focusing driving frequency and adjusting the center of weight of the movable part when the direction of radial rolling is not the desired direction, and the center of weight of the movable part is adjusted until radial rolling is induced in a direction in which an optical axis of an objective lens is perpendicular to an information storage surface of an information storage medium.

57 Claims, 13 Drawing Sheets

U.S. PATENT DOCUMENTS

| | | | |
|---|---|---|---|
| 6,570,828 B2 | 5/2003 | Kikuchi et al. | |
| 6,874,154 B2 * | 3/2005 | Inoue et al. | 720/675 |
| 2002/0176348 A1 | 11/2002 | Kikuchi et al. | |
| 2003/0133373 A1 | 7/2003 | Kwon et al. | |

FOREIGN PATENT DOCUMENTS

| | | |
|---|---|---|
| EP | 0 348 845 A2 | 1/1990 |
| JP | 10-040561 | 2/1998 |
| WO | WO 03/052485 A2 | 6/2003 |

OTHER PUBLICATIONS

Preliminary Notice of the First Office Action dated Mar. 24, 2009 of the Taiwanese Patent Application No. 94119464.

* cited by examiner

OPTICAL PICKUP ACTUATOR, METHOD OF MANUFACTURING THE OPTICAL PICKUP ACTUATOR, AND OPTICAL PICKUP EMPLOYING THE OPTICAL PICKUP ACTUATOR, AND OPTICAL RECORDING AND/OR REPRODUCING APPARATUS EMPLOYING THE OPTICAL PICKUP

CROSS-REFERENCE TO RELATED APPLICATIONS

This application claims the benefit of Korean Application No. 2004-46652, filed Jun. 22, 2004, in the Korean Intellectual Property Office, the disclosure of which is incorporated herein by reference.

BACKGROUND OF THE INVENTION

1. Field of the Invention

The present invention relates to an optical recording and/or reproducing apparatus, and, more particularly, to an optical pickup actuator designed to improve adaptability of an optical disc having a deflection error, a method of manufacturing the same, and an optical pickup and an optical recording and/or reproducing apparatus employing the same.

2. Description of the Related Art

In general, an optical recording and/or reproducing apparatus to record and/or reproduce information onto and/or from an information storage surface of an information storage medium, such as a recording surface of an optical disc, employs an optical pickup to perform recording and/or reproducing of information on the recording surface of the optical disc by radiating light onto and/or receiving light reflected from the recording surface while moving in a radial direction of the optical disc.

The optical pickup includes an actuator. FIG. 1 is a plan view of a conventional optical pickup actuator, and FIG. 2 is a side view of the optical pickup actuator of FIG. 1. Referring to FIGS. 1 and 2, the conventional optical pickup actuator includes a base 7, a holder 8 fixed onto the base 7, a blade 2 that is movably supported by a suspension 6 having one end fixed to the holder 8 and on which an objective lens 1 is mounted, a focus coil 3 and tracking coils 4 that are respectively mounted on the blade 2 so as to form paths through which currents flow to drive the objective lens 1 in a focus direction A and a tracking direction B, and a magnet 10 which generates a magnetic field that interacts with currents flowing through the focus coil 3 and tracking coils 4 to produce an electromagnetic force to drive the blade 2 and the yokes 9. In FIGS. 1 and 2, reference numeral 11 denotes a turntable on which an optical disc D is placed, and reference numeral 12 denotes a motor 12 rotating the turntable 11.

In the conventional optical pickup actuator having the above-described configuration, when current is supplied to the focus coil 3, the blade 2 is driven in the focus direction A by an electromagnetic force that is generated due to an interaction between the current and magnetic field generated by the magnets 10 and the yokes 9. In this case, since the focusing direction is determined according to the direction of the current flowing through the focus coil 3, a focal distance between the objective lens 1 and the recording surface of the optical disc D may be adjusted by controlling the amount of current flowing through the focus coil 3. Furthermore, the blade 2 is driven in the tracking direction B by an electromagnetic force. By controlling the amount of current flowing through the tracking coils 4, the objective lens 1 is allowed to precisely follow the desired track on the optical disc D.

Although a completely flat recording surface is ideal for recording, the optical disc is actually curved slightly upward or slightly downward so that the optical disc has a deflection error. The deflection error of the optical disc D acts as a focusing error with respect to the optical pickup actuator. That is, when the optical disc D with the deflection error rotates on the turntable 11, the focal distance between the objective lens 1 and the optical disc D varies according to an amount of the curvature of the optical disc. Thus, to compensate for variation due to the deflection error of the optical disc D, the optical pickup actuator performs control in the focus direction A.

Since the blade 2 moves in an arc by hanging on one end of the suspension 6, the blade 2 does not move precisely in either a vertical or a horizontal direction during focusing or tracking operations due to an error introduced within the manufacturing process or a problem with the structure of the optical pickup actuator. Instead, the blade 2 suffers a rolling phenomenon as shown in FIG. 2 in which the blade 2 sways from side to side or in backward and forward directions. Rolling, in which the blade 2 tilts about a rotary axis that is normal to a radial direction of the optical disc D as shown in FIG. 2, is called radial rolling. When the blade 2, gets close to the outer perimeter of the optical disc D, the blade 2 moves upward. In other words, when the objective lens 1 moves toward the optical disc D, radial rolling is in the positive (+) direction. Conversely, when the blade 2 moves downward, radial rolling is in the negative (−) direction.

FIGS. 3A-3C show three types of radial rolling. FIG. 3A shows a first type of radial rolling (hereinafter referred to as 'type A radial rolling'). Referring to FIG. 3A, when the blade 2 moves upward, i.e., when the objective lens 1 moves toward the optical disc D, radial rolling is in the positive direction, and conversely, when the objective lens 1 moves away from the optical disc D, radial rolling is in the negative direction. FIG. 3B shows a second type of radial rolling (hereinafter referred to as 'type B radial rolling). When the objective lens 1 moves toward the optical disc D, radial rolling is in the negative direction, and conversely, when the objective lens 1 moves away from the optical disc D, radial rolling is in the positive direction. FIG. 3C shows a third type of radial rolling (hereinafter referred to as 'type C radial rolling'). Referring to FIG. 3C, radial rolling is in the same direction, either positive or negative, regardless of whether the objective lens 1 moves toward or away from the optical disc D.

Type A radial rolling is effective in reducing a deflection error since this type of rolling causes an optical axis C1 of the objective lens 1 to be almost perpendicular to the recording surface of the optical disc D when the optical pickup actuator performs focus control to adjust the position of the objective lens 1 with respect to the optical disc D having a deflection error. Conversely, the type B radial rolling results in an increase in the deflection error since the angle between the optical axis C1 of the objective lens 1 and the recording surface of the optical disc D exceeds 90 degrees. The type C radial rolling is effective for situations when either the objective lens 1 moves upward or when the objective lens 1 moves downward.

Among the above three types of radial rolling, the type A radial rolling is ideal for improving adaptability to an optical disc with a deflection error, and the type C radial rolling is not ideal but may be usable. However, type B radial rolling is not desirable because this type of rolling has a fatal effect on the recording/reproduction performance. However, in actuality, a nearly equal percentage of optical pickup actuators that exhibit the three types of radial rolling are fabricated as a result of assembling tolerances and various other factors. To solve the problem, only optical pickup actuators exhibiting the types A and C radial rolling are used while those having the type B radial rolling have been discarded as being defective. However, treating the optical pickup actuators exhibiting the type B radial rolling as defective results in low productivity.

When an optical pickup actuator is designed to have radial rolling characteristics that may cancel the deflection error of an optical disc during focusing operation, improving the control performance of the optical pickup actuator is possible. Thus, there is a need for a method of inducing desired radial rolling characteristics. That is, having a method of inducing type A radial rolling characteristics to improve the adaptability of an optical pickup actuator is relatively highly desirable.

An optical pickup actuator exhibiting the type A radial rolling may offset the deflection error of an optical disc when performing focus control by positioning the objective lens with respect to the optical disc since this type of rolling causes the angle between the optical axis of an objective lens and the recording surface of the optical disc to tend to be closer to 90 degrees.

To induce the type A rolling characteristics, the stiffness of each of inner and outer suspensions with respect to the objective lens may be varied. This approach has been proposed in U.S. Pat. No. 6,570,828.

The above-cited reference presents an example in which a movable part is tilted at a predetermined angle when being driven in the focus direction by changing the diameter of a suspension so that the stiffness of the suspension close to the inner perimeter of the optical disc is higher than that of the suspension close to the outer perimeter thereof or that an elastic force of the suspension close to the inner perimeter is suppressed.

As the speed of an optical recording and/or reproducing apparatus increases, the rotating frequency of an optical disc increases. Since the operating frequency of an optical pickup actuator in focus or tracking direction synchronizes with the rotating frequency of the optical disc, the actual operating frequency moves to a high frequency band.

The conventional method of inducing type A rolling characteristics is effective for a low frequency band extending below the first resonant frequency of the optical pickup actuator, but not for a high frequency band above the first resonant frequency. That is, offering the type A rolling characteristics by adjusting a stiffness of the suspension located at the inner and outer perimeters of the optical disc in the high frequency band is difficult. Thus, the conventional method cannot provide high adaptability to the deflection error of the disc for a high-speed optical recording and/or reproducing apparatus.

SUMMARY OF THE INVENTION

The present invention provides an optical pickup actuator designed to improve adaptability to an optical disc with a deflection error for high-speed optical recording and/or reproducing by inducing radial rolling during focusing operation up to a high frequency band above the first resonant frequency so that the recording surface of an optical disc is almost perpendicular to the optical axis of an objective, a method of fabricating the optical pickup actuator, an optical pickup employing the optical pickup actuator, and an optical recording and/or reproducing apparatus employing the optical pickup.

According to an aspect of the present invention, there is provided an optical pickup actuator including: a blade supported by a plurality of suspensions to be movable with respect to a base and on which an objective lens is mounted; and a magnetic circuit to drive a movable part, the movable part including the blade. The movable part includes a weight center adjusting element of the movable part in order to induce radial rolling in a direction in which an optical axis of an objective lens is perpendicular to an information storage surface of an information storage medium, during a focusing operation in a high frequency band above the first resonant frequency of the optical pickup actuator.

The element may be a mass being added or subtracted on at least one of the inner and outer perimeters of the movable part with respect to the center of the objective lens in the radial direction of the information storage medium. The mass may be added or subtracted on the blade. The mass may be obtained by attaching an adhesive to the blade in order to adjust the center of weight of the movable part.

The plurality of suspensions and the movable part can be designed to induce radial rolling during a focusing operation up to at least 100 Hz, which causes the optical axis of the objective lens to be perpendicular to the information storage surface of the information storage medium. The optical pickup actuator may be formed to have a rolling frequency of 100 Hz or greater.

The plurality of suspensions may include inner suspensions and outer suspensions about the center of the objective lens and respectively positioned in the inner and outer perimeters of the optical disc in a radial direction. The inner suspensions can have a higher stiffness than the outer suspensions.

The plurality of suspensions and the movable part may be designed to induce radial rolling that causes the optical axis of the objective lens to be perpendicular to the information storage of the information storage medium during a focusing operation in frequency bands ranging from a low frequency band below 1 Hz to at least 100 Hz.

According to another aspect of the present invention, there is provided a method of manufacturing an optical pickup actuator including a blade supported by a plurality of suspensions to be movable with respect to a base and on which an objective lens is mounted and a magnetic circuit to drive a movable part including the blade. The method includes checking the direction of radial rolling for each focusing driving frequency and adjusting the center of weight of the movable part when the direction of radial rolling is not the desired direction. The center of weight of the movable part is adjusted until radial rolling is induced in a direction in which an optical axis of an objective lens is perpendicular to an information storage surface of an information storage medium.

The center of weight of the movable part can be adjusted by adding or subtracting a mass on at least one of the inner and outer perimeters of the movable part about the center of the objective lens in the radial direction of the optical disc. The center of weight of the movable part may be adjusted to induce radial rolling in a focusing driving frequency range of at least 100 Hz in a direction in which the optical axis of the objective lens is perpendicular to the information storage surface of the information storage medium.

According to another aspect of the present invention, there is provided an optical pickup including the optical pickup actuator or the optical pickup actuator manufactured according to the above-described method.

According to another aspect of the present invention, there is provided an optical recording and/or reproducing apparatus including an actuator driving an objective lens, an optical pickup that is movably installed in a radial direction of an information storage medium and reproduces and/or records information from/on the information storage medium, and a controller controlling the optical pickup. The actuator is the actuator manufactured according to the above-described method.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
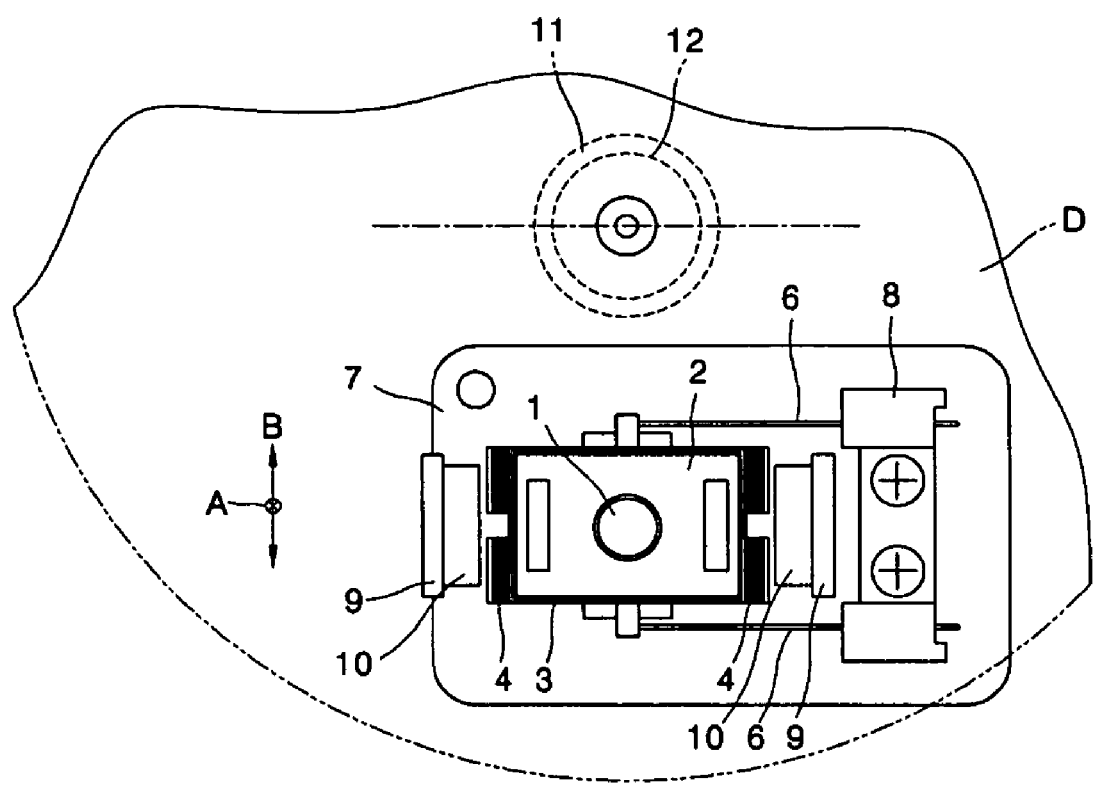
FIG. 1 is a plan view of a conventional optical pickup actuator.
Figure 2:
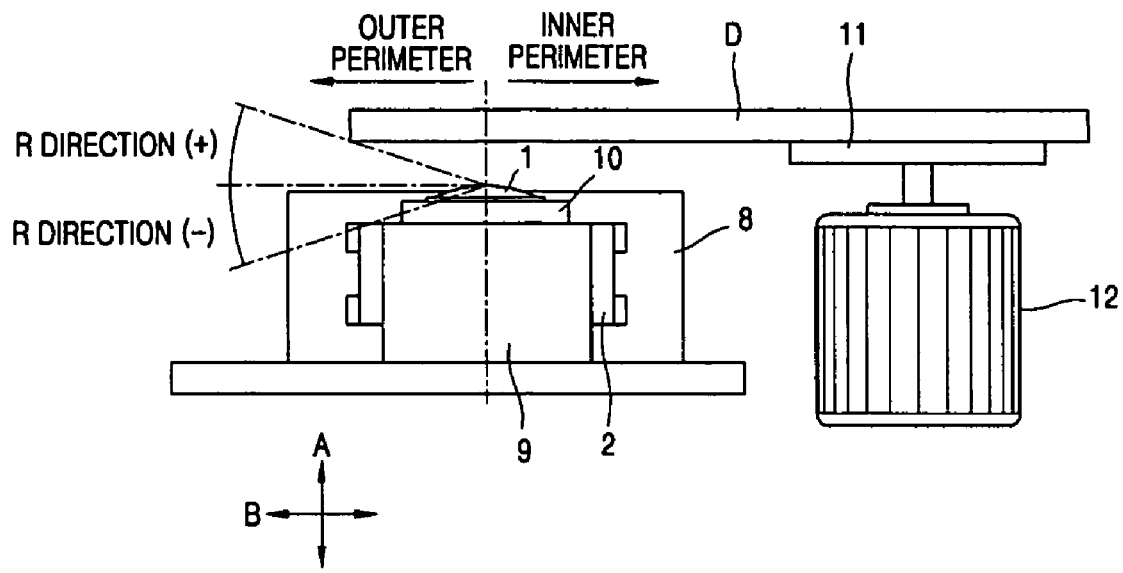
FIG. 2 is a side view of the optical pickup actuator of FIG. 1.
Figure 3A:
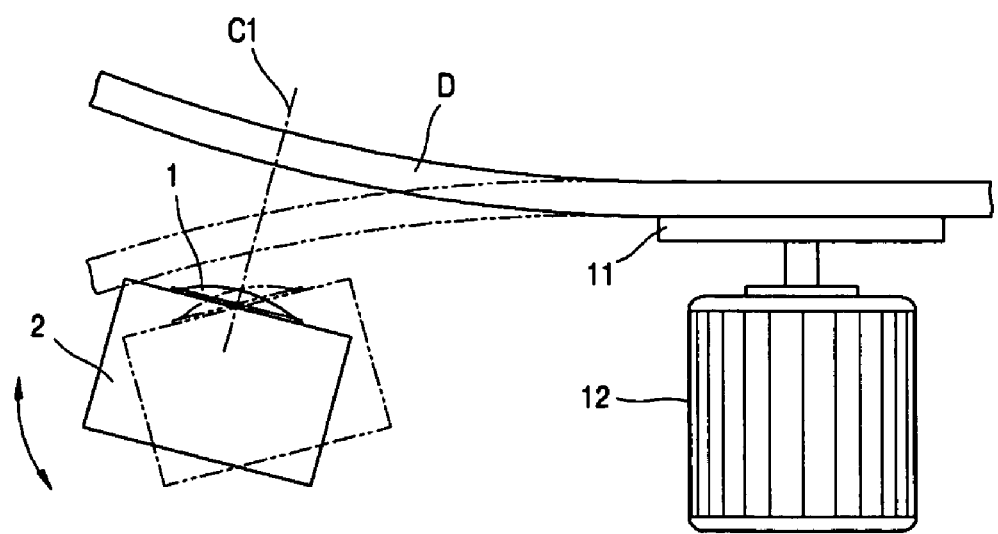
FIGS. 3A-3C illustrate three types of radial rolling that may be induced during focusing according to FIG. 1.
Figure 3B:
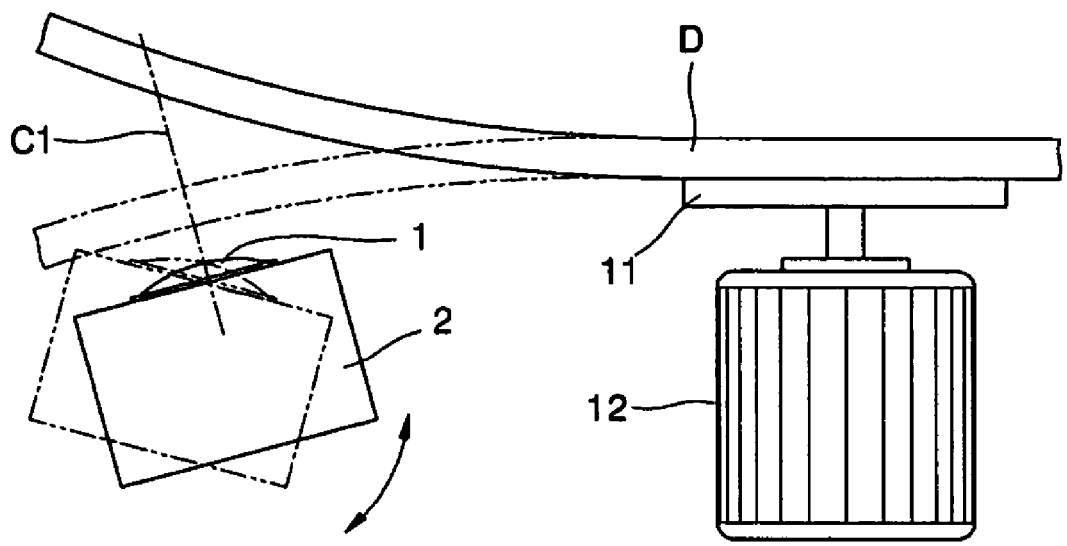
Figure 3C:
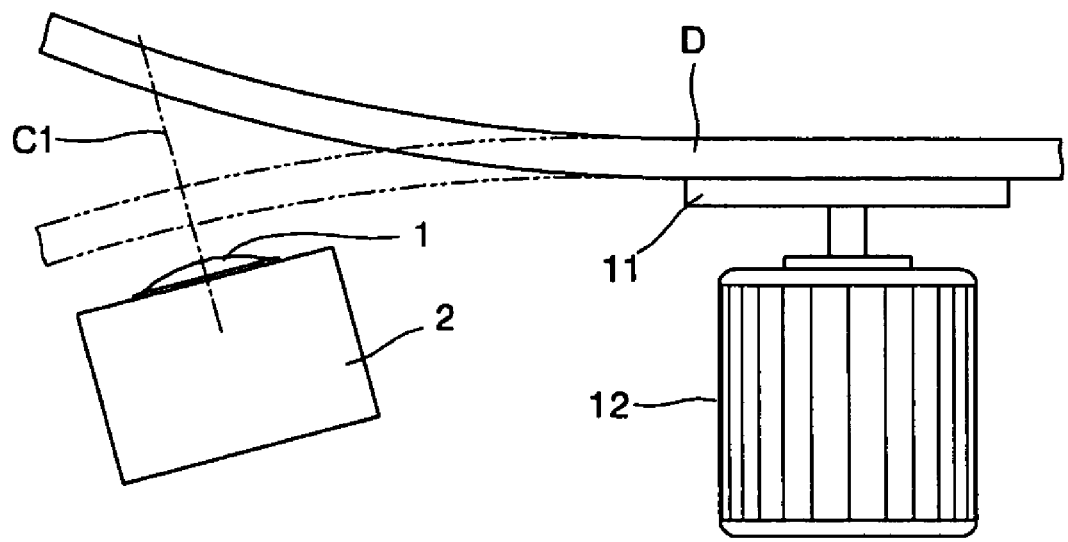

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
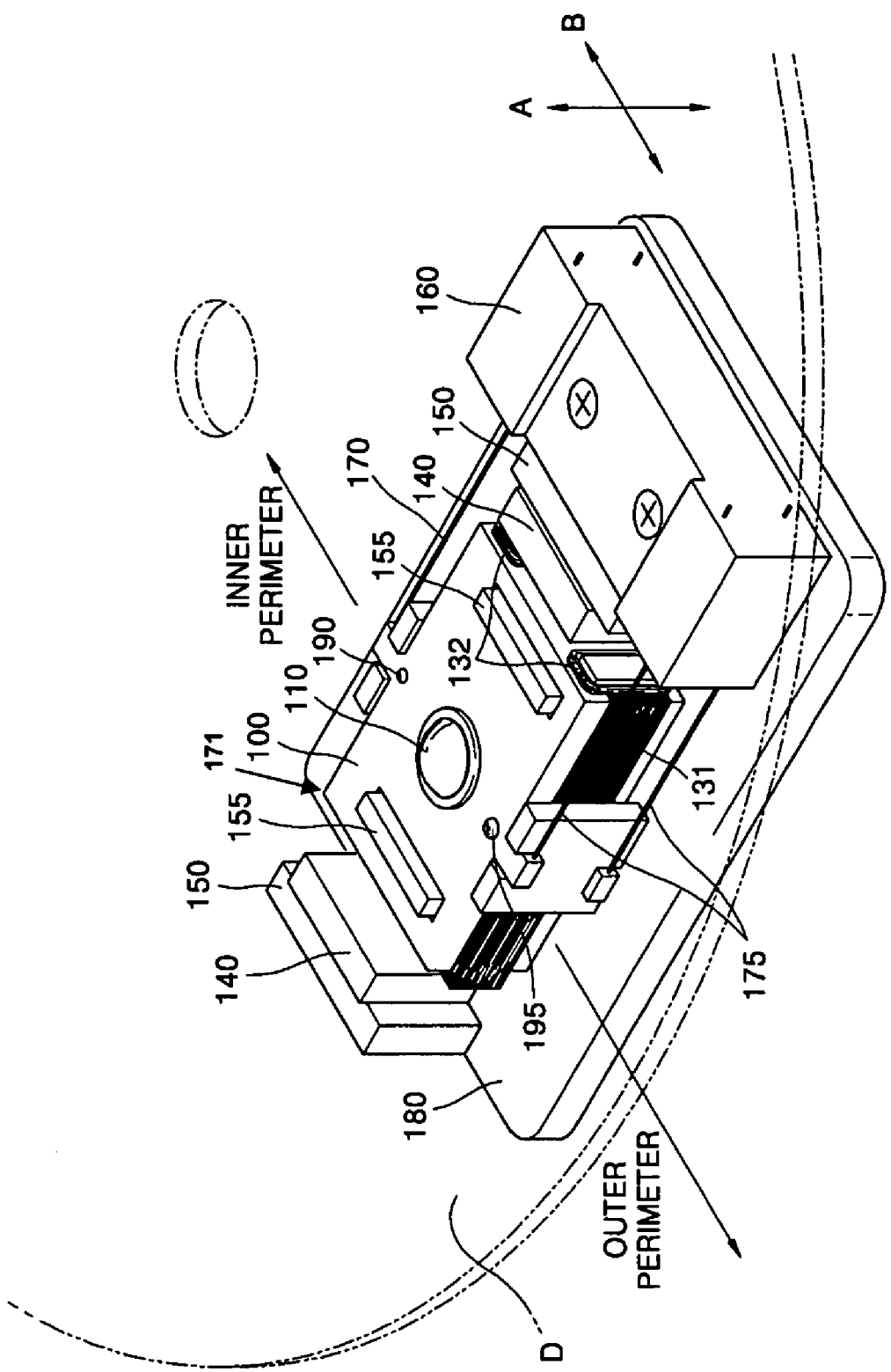
FIG. 4 is a schematic perspective view of an optical pickup actuator according to an embodiment of the present invention.
Figure 5:
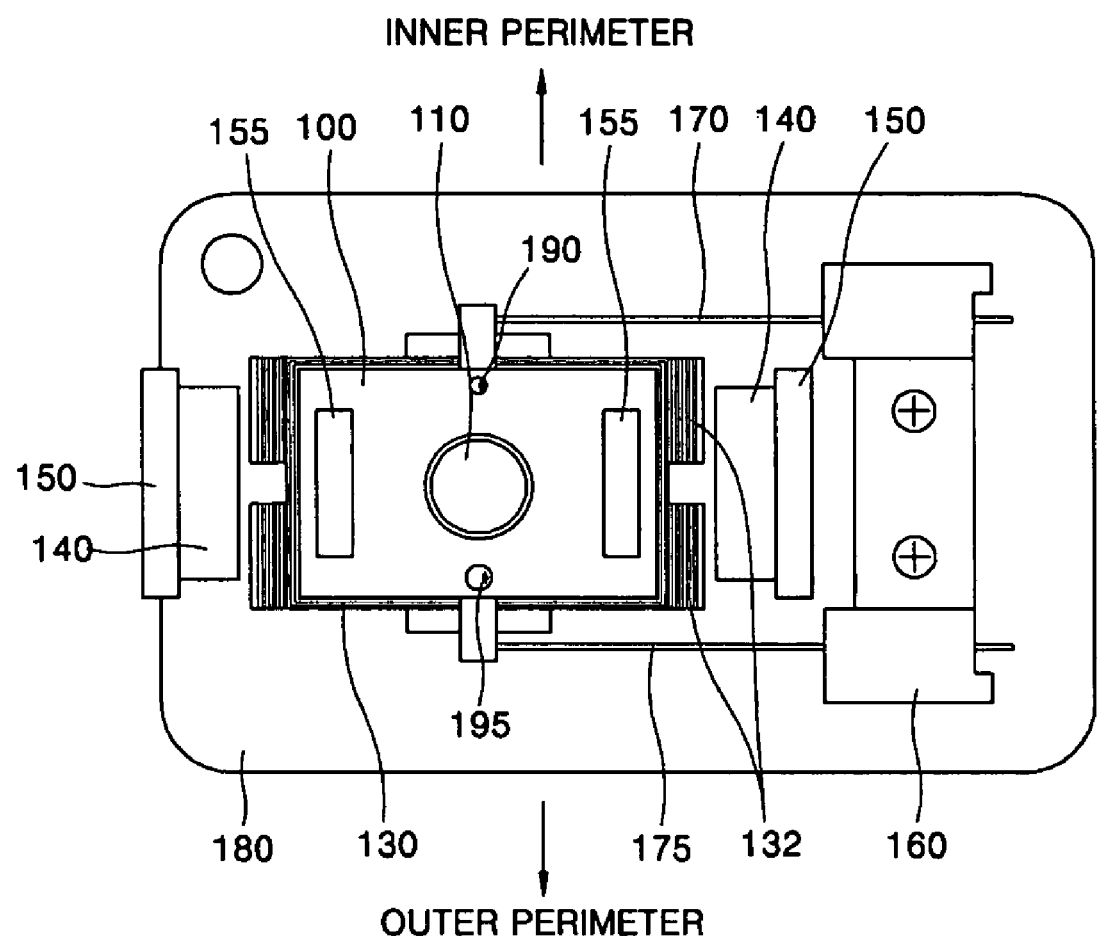
FIG. 5 is a plan view of FIG. 4.

Referring to FIGS. 4 and 5, an optical pickup actuator according to an embodiment of the present invention includes a base 180, a holder 160 positioned at one side of the base 180, a movable part 171 supported by a plurality of suspensions 170 and 175 to be movable with respect to the base 10, and a magnetic circuit driving the movable part 171. The movable part 171 is tilted at a predetermined angle to correspond to a focal height variation that is caused due to a bending of an optical disc D and such that the optical axis of an objective lens 110 is almost perpendicular to an information storage surface of an information storage medium, i.e., the recording surface of the optical disc D.

The movable part 171 includes a blade 100 to mount the objective lens 110, weight center adjusting elements of the movable part 171, and the magnetic circuit portion mounted on the blade 100. Each of the plurality of suspensions 170 and 175 has one end coupled to the holder 160 and the other end coupled to the blade 100 such that the blade 100 is movable with respect to the base 180.

The weight center adjusting element induces radial rolling during focusing operations at frequencies that are higher than the first resonant frequency such that the optical axis of the objective lens 110 is perpendicular to the recording surface of the optical disc D. The movable part 171 is tilted at a predetermined angle by the weight center adjusting elements such that the optical axis of the objective lens 110 may be nearly perpendicular to the recording surface of the optical disc D during a focusing operation in a high frequency band. Thus, the movable part 171 exhibits the type A rolling characteristics. That is, when the objective lens 110 moves closer to the optical disc D, radial rolling in the positive (+) direction occurs. Conversely, when the objective lens 110 moves away from the optical disc D, radial rolling in the negative (−) direction occurs.

The weight center adjusting elements also act to adjust a mass unbalance in the movable part 171 and correspond to masses 190 and 195 being added or subtracted on at least one of the inner or outer perimeters of the blade 100 about the center of the objective lens 110 in the radial direction of the optical disc D.

Adjusting the mass unbalance in the movable part 171 may be achieved by adding or subtracting masses 190 and 195 onto and/or from at least one of the inner and outer perimeters of the blade 100. It is understood that masses 190 and 195 may comprise adhesives or other similar materials to achieve similar effects.

FIGS. 4 and 5 show an example in which different masses 190 and 195 are added at portions of the blade 100 on the inner and outer perimeters, to which the suspensions 170 and 175 are connected. In this case, a mass unbalance and the weight center of the movable part 171 may be adjusted by adding the masses 190 and 195 on only one of the inner and outer perimeters of the blade 100 or by adjusting a magnitude or location difference in masses 190 or 195 located on the inner and outer perimeters or their loading positions.

To reduce the magnitudes of added masses 190 and 195 so as to induce (+) radial rolling, in an embodiment of the invention, a center of a weight of the movable part 171 is made to be coincident with the center of a force in the radial direction of the optical disc D.

By adjusting the center of weight in this way, designing an optical pickup actuator capable of inducing radial rolling (the type A radial rolling) in which the optical axis of the objective lens 110 is perpendicular to the recording surface of the optical disc D even when the movable part 171 including the blade 100 is driven in the focus direction in a high frequency band extending above the first resonant frequency of the actuator is possible.

Thus, when the optical pickup actuator exhibiting the radial rolling characteristics is applied to a high-speed optical recording/reproducing apparatus in which the optical disc D rotates at a frequency that is higher than the first resonant frequency, radial rolling (the type A radial rolling) is induced such that the optical axis of the objective lens 110 is nearly perpendicular to the recording surface of the optical disc D.

This near perpendicularity tends to provide high adaptability to an optical disc with a deflection error.

A reason that the type A radial rolling characteristics may be induced in a high frequency band by adjusting mass unbalance as described above will be described in detail later.

The first resonant frequency of the actuator is determined by various factors such as the structure, material, and dimensions during manufacturing. That the first resonant frequency of an optical pickup actuator used in a DVD player (DVDP) is about 30 to 40 Hz while the first resonant frequency of an actuator used in blu-ray disc (BD) 1× and BD 2× is about 40 to 60 Hz is known in the art. The first resonant frequency of an optical pickup actuator may vary from manufacturer to manufacturer.

The blade 100 is elastically supported by the plurality of suspensions 170 and 175 such that the blade 100 is movable with respect to the holder 160. The plurality of suspensions 170 and 175 include a pair of inner suspensions 170 that are positioned so as to be close to the inner perimeter of the optical disc D in a radial direction and a pair of outer suspensions 175 are positioned close to the outer perimeter thereof.

The plurality of suspensions 170 and 175 may comprise wires. When the coils of the magnetic circuit are mounted on the blade 100 as shown in FIGS. 4 and 5, the plurality of suspensions 170 and 175 may be used as a path through which current is supplied in focusing and tracking operations.

In an embodiment of the invention, the optical pickup actuator according to the present invention is formed such that an optical recording and/or reproducing apparatus according to the present invention employing the optical pickup actuator may reproduce an information recording signal in a low frequency band while maintaining optimum optical aberration conditions for the optical disc D with a deflection error without using a mechanical tilt.

To accomplish this, the inner suspensions 170 may be formed to have a higher stiffness than the outer suspensions 175. As a result, the movable part 171 tends to be tilted at a predetermined angle such that the optical axis of the objective lens 110 is almost perpendicular to the recording surface of the optical disc D, which makes inducing the type A radial rolling possible when focus driving is performed in a low frequency band, i.e., in a frequency band below the first resonant frequency of the optical pickup actuator.

As is evident from Equation (1) to be described below, the transfer function characteristics of the optical pickup actuator are such that stiffness significantly affects in a frequency band below the first resonant frequency, but the effect of stiffness significantly decreases in a frequency band above the first resonant frequency while the effect of mass significantly increases.

When the actuator is tilted at an angle such that radial rolling occurs in the (+) direction when the objective lens 110 moves toward the optical disc D while radial rolling occurs is in the (−) direction when the objective lens 110 moves away from the optical disc D, the actuator performs a focus control to properly adjust the position of the objective lens 110 with respect to the optical disc D having a deflection error. Both of the above-mentioned two conditions should be met simultaneously to induce radial rolling in which the optical axis of the objective lens 110 is nearly perpendicular to the recording surface of the optical disc D regardless of focusing driving frequency.

That is, to adapt to the optical disc with a deflection error, during a focusing operation in a low frequency band, the stiffness of the inner suspensions 170 should be higher than that of the outer suspensions 175. On the other hand, to adapt to the optical disc D with a deflection error, during focusing in a high frequency band, the center of weight of the movable part 171 needs to be adjusted by selectively adding the masses 190 and 195.

The optical pickup actuator of the present invention that is able to meet the above-described two conditions may adapt to a variation in focus height caused by the curvature of the optical disc D during focusing operations in frequency bands ranging from a low frequency band below 1 Hz to higher frequency bands around 200 Hz. In this case, the optical axis of the objective lens 110 is tilted at a predetermined angle to the recording surface of the optical disc D.

Thus, the optical pickup actuator may induce a desired radial rolling (the type A radial rolling) during the focusing operations in frequency bands ranging from a low frequency band below the first resonant frequency to a high frequency band above the first resonant frequency (up to 200 Hz band).

Meanwhile, in an embodiment of the invention, the optical pickup actuator is formed to have a rolling frequency of about 100 Hz. To accomplish this, decreasing the moment of inertia of the movable part 171 and increasing the distance between the inner suspensions 170 and the outer suspensions 175 that support the movable part 171 is desirable.

As is described below with reference to FIGS. 8 and 9, the sign of the radial rolling is reversed with respect to this rolling frequency. Rolling frequency $f_\theta$ is defined by Equation (1):

$$f_\theta = \frac{1}{2\pi}\sqrt{\frac{k_\theta + kl_s^2}{I}} \quad (1)$$

where $K_\theta$ is a rotation stiffness, $K_\theta=kl^2$ (k represents the stiffness of each of the suspensions 170 and 175 and l is the distance between the inner and outer suspensions 170 and 175), and I is the mass moment of inertia of the movable part 171. $l_s$ denotes a difference between the center of force of the movable part 171 and the center of the suspensions 170 and 175. When the center of a force of the movable part 171 coincides with the center of the suspensions 170 and 175, the term $kl_s^2$ is 0.

As defined by Equation (1), increasing rolling frequency is achieved by decreasing the mass moment of inertia of the movable part 171, increasing the stiffness of each of the suspensions 170 and 175, increasing the difference between the center of force of the movable part 171 and the center of the suspensions 170 and 175, and increasing the difference between the center of a force of the movable part 171 and the center of the suspensions 170 and 175.

To obtain a high rolling frequency of about 100 Hz, decreasing the weight and cross-sectional area of the movable part 171 so as to reduce the mass moment of inertia of the movable part 171 is necessary, the stiffness of and the distance between each of the inner and outer suspensions 170 and 175 is increased, and the stiffness of the inner suspensions 170 is made to be different from that of the outer suspensions 175. In this way, the rolling frequency is determined by the structure and material of the optical pickup actuator.

That the rotation speed of an optical disc D is about 1,400 to 1,500 rpm and that a focusing frequency is about 20 Hz in the case of a DVDP is known in the art. In the case of a 1×BD, the rotation speed of optical disc D is about 2,300 rpm and a focusing frequency is about 40 Hz. For a 2×BD, the rotation speed of optical disc D is about 4,600 rpm and a focusing frequency is about 75 Hz. The focusing frequency and the rotation speed of optical disc D for each optical recording and/or reproducing apparatus may vary from manufacturer to manufacturer. As is described above, the 2×BD has focusing frequency of about 75 Hz that is, of course, lower than 100 Hz.

Figure 6:
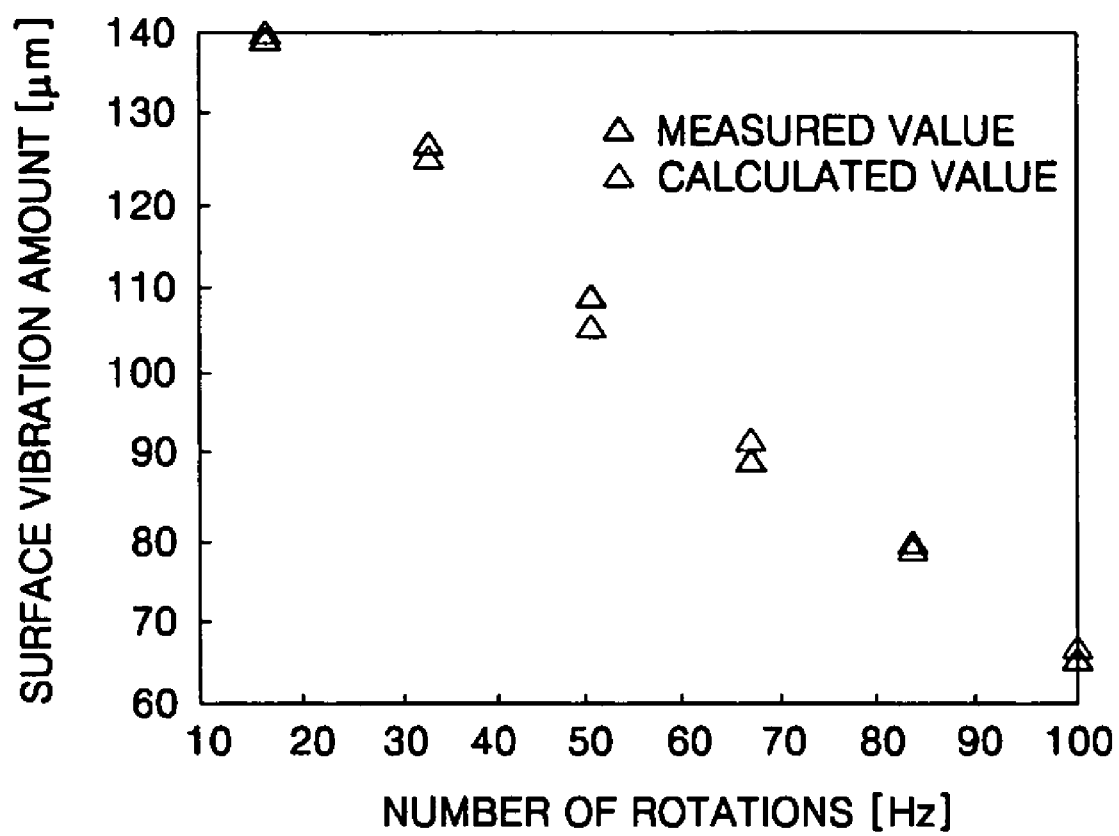
FIG. 6 illustrates the relationship between the number of rotations of an optical disc and surface vibration amount of the optical disc in a focusing direction.

FIG. 6 illustrates the relationship between the number of rotations of an optical disc D and a surface vibration amount of the optical disc D in a focus direction. Referring to FIG. 6, a measured value and a calculated value of a surface vibration amount in the focus direction for the number of rotations of the optical disc D are similar. Furthermore, at 100 Hz, the surface vibration amount decreases to less than half the surface vibration amount measured at 20 Hz.

As is clearly evident from FIG. 6, when the optical disc D rotates above 100 Hz, (in this case, a focusing frequency may be also higher than about 100 Hz), the surface vibration amount in the focus direction of the optical disc D significantly decreases. This is because a curvature of the optical disc is flattened as the number of rotations of the optical disc D increases above a predetermined value.

At a frequency above 100 Hz, determining the magnitude and direction of radial rolling due to a decrease in surface vibration amount as the number of rotations of the optical disc D increases is not necessary. Thus, the rolling frequency of about 100 Hz is sufficient to obtain the desired radial rolling characteristics for the optical pickup actuator according to the present invention.

In this way, the optical pickup actuator according to the present invention may be designed to induce desired rolling characteristics by providing a rolling frequency of about 100 Hz, by adjusting mass unbalance in the movable part 171, and by optimizing the difference between the stiffness of each of the inner and outer suspensions 170 and 175. The optical pickup actuator thus designed may sufficiently adapt to a deflection error that results from the curvature of the optical disc D during focusing operations in frequency bands ranging from a low frequency band below 1 Hz to a high frequency band above the rotating frequency of an optical disc D for a high-speed optical apparatus.

The optical pickup actuator according to the present invention may be designed to have a rolling frequency lower than or higher than 100 Hz, if necessary, as long as the rolling frequency is higher than the focusing frequency that is required for the high-speed optical recording and/or reproducing apparatus.

Referring to FIGS. 4 and 5, the magnetic circuit includes magnets 140 that are disposed opposite each other with the blade 100 placed therebetween, external yokes 150 which are installed on the base 180 and fix the magnets 140, internal yokes 155 which are disposed on the base 180 to face the magnets 140 and guide the blade 100, a focusing coil 131 wound around an outside of the blade 100, and tracking coils 132 wound at sidewalls of the blade 100 to face the magnets 140.

When current flows through the focusing coil 131 and/or the tracking coils 132, the blade 100 is driven in a focusing direction A and/or a tracking direction B, respectively, by an electromagnetic force generated by an interaction between the coils 131 and/or 132 and the magnetic field of the magnets 140. When the blade 100 is driven in the focusing direction A, the direction of a vertical movement of the blade 100 is determined by the direction of the current flowing through the focusing coil 131. Likewise, the direction of a horizontal movement of the blade 100 is determined by the direction of current flowing through the tracking coils 132. In this case, the internal yokes 155 not only serve to guide the blade 100, during a focusing or tracking operation of the movable part 171, but also form a magnetic path together with the external yokes 150. The focusing and/or tracking operations of the movable part 171 allows a beam passing through the objective lens 110 to be properly focused on the optical disc D to enable information to be recorded on and/or read from the disc D.

While FIGS. 4 and 5 illustrate an example of the magnetic circuit that may be applied to the optical pickup actuator of the present invention, it is understood that various other types of magnetic circuits known in the art can be used. For example, although FIG. 4 shows the magnetic circuit driving the movable part 171 in the focus and tracking directions, the optical pickup actuator of the present invention may additionally include a magnetic circuit driving the movable part 171 in a radial tilt direction as well as in the focus and tracking directions. Since various types of magnetic circuits enable driving in focus, tracking, and tilt directions or combinations thereof are well-known in the art, their descriptions will not be given.

A reason that the type A radial rolling characteristics may be induced in a high frequency band by adjusting mass unbalance in the movable part 171 will now be described. A tilt angle θ of the movable part 171 with respect to a radial direction in the optical pickup actuator is defined by Equation (2):

$$\theta = \frac{|d|[-l_a(k - m\omega^2) + kl_s]}{\sqrt{(K_\theta + kl_s^2 - I\omega^2)^2 + (C_R\omega)^2}} e^{j(\omega t - \phi)} \quad (2)$$

where d is the distance by which the movable part 171 is moved from a reference position in the focus direction, $l_a$ is the difference between the center of force of the movable part 171 and the center of weight thereof, k is the stiffness of each of the suspensions 170 and 175, and m is the weight of the movable part 171. ω is 2πf (f is the focusing frequency of the movable part 171), $l_s$ is the difference between the center of force of the movable part 171 and the center of the suspensions 170 and 175, $K_\theta$ denotes a rotational stiffness, I is a mass moment of inertia, and $C_R$ is a rotation damping factor.

As is evident from Equation (2), radial rolling is mainly affected by factors such as the difference $l_a$ between the center of force of the movable part 171 and the center of weight thereof, the stiffness k of each of the suspensions 170 and 175, the weight m and driving frequency f of the movable part 171, and the difference $l_s$ between the center of force of the movable part 171 and the center of the suspensions 170 and 175.

As the speed of an optical recording and/or reproducing apparatus increases, the number of rotation of an optical disc D increases. Since the operating frequency of an optical pickup actuator in focus or tracking direction synchronizes with the rotating frequency of the optical disc D, the actual focusing driving frequency moves to a high frequency band. Thus, the number of rotations of the optical disc D may be controlled such that an optical pickup follows inner and outer tracks of the optical disc D at the same linear velocity. The number of rotations of the optical disc D may decrease as the optical pickup moves from the inner to outer tracks. The focusing driving frequency may be the maximum number of rotations of the optical disc D. The amount of radial rolling varies according to the focusing driving frequency of the movable part 171, as demonstrated in Equation (2).

Figure 7:
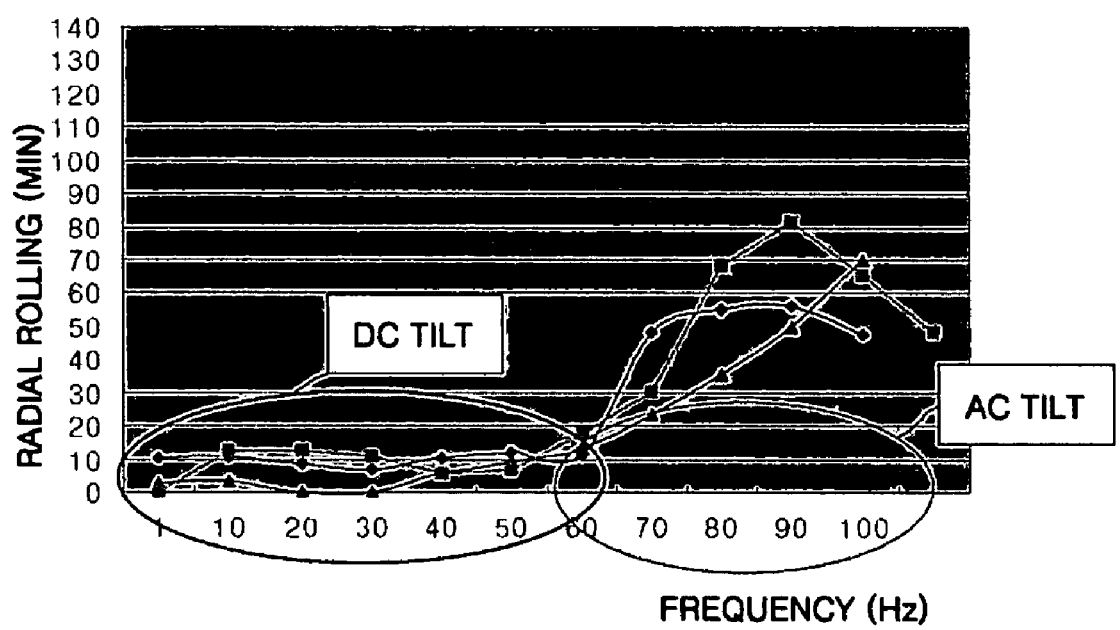
FIG. 7 illustrates the value of radial rolling measured at each focusing frequency of a movable part during focus driving.

FIG. 7 illustrates the amount of radial rolling measured at each focusing driving frequency of a movable part 171 when the movable part 171 of an optical pickup actuator moves by 0.4 mm in the positive (+) focus direction (closer to the optical disc D). Three sets of optical pickup actuators were used for this measurement, and FIG. 7 shows the amount of radial rolling measured for each set of optical pickup actuator. The optical pickup actuator used has the first resonant frequency of about 45 Hz and radial rolling frequency of about 85 Hz.

As is evident from FIG. 7, as the focusing driving frequency increases, the amount of radial rolling increases. In particular, the amount of radial rolling rapidly increases in a high focusing driving frequency region. A frequency region is divided into two intervals with respect to the first resonant frequency of the optical pickup actuator: (1) a dc tilt interval during which the amount of radial rolling remains almost unchanged and (2) an ac tilt interval during which the amount of radial rolling substantially significantly varies with frequency.

The amount of radial rolling sharply increases as the driving frequency increases in a high frequency band because the amount of radial rolling is a function of the square of the driving frequency in the numerator of Equation (2). As is evident from FIG. 7, radial rolling is significantly affected by the driving frequency of the movable part 171 in a high frequency band. Since $\omega^2$ in the numerator of Equation (2) equals $(2\pi f)^2$, radial rolling is affected by the square of the driving frequency ($f^2$) and the difference $l_a$ between the center of force of the movable part 171 and the center of weight thereof multiplied by $f^2$.

Thus, the movable part 171 is tilted such that the optical axis of the objective lens 110 is almost perpendicular to the recording surface of the optical disc D by adjusting the driving frequency f of the movable part 171 and difference $l_a$ between the center of force of the movable part 171 and the center of weight, thereby inducing desired radial rolling in a high frequency band.

The optical pickup actuator according to the present invention may vary the center of weight of the movable part 171 by adjusting a mass unbalance in the movable part 171 so as to adjust the difference between the center of force of the movable part 171 and the center of weight. Thus, the optical pickup actuator according to the present invention induces the desired rolling characteristics by adjusting the mass unbalance in the movable part 171.

Figure 8:
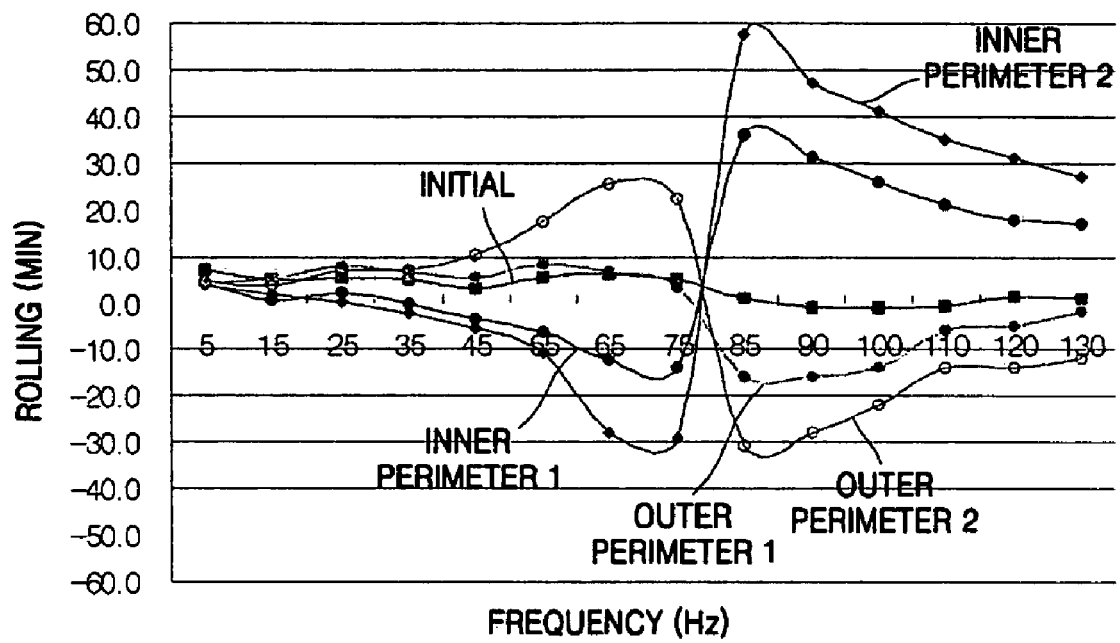
FIGS. 8 and 9 illustrate the amounts of radial rolling measured on one set of actuator for a BLU-ray disc (BD) and the other set of actuator for BD in which mass distributions are different in a radial rolling direction.
Figure 9:
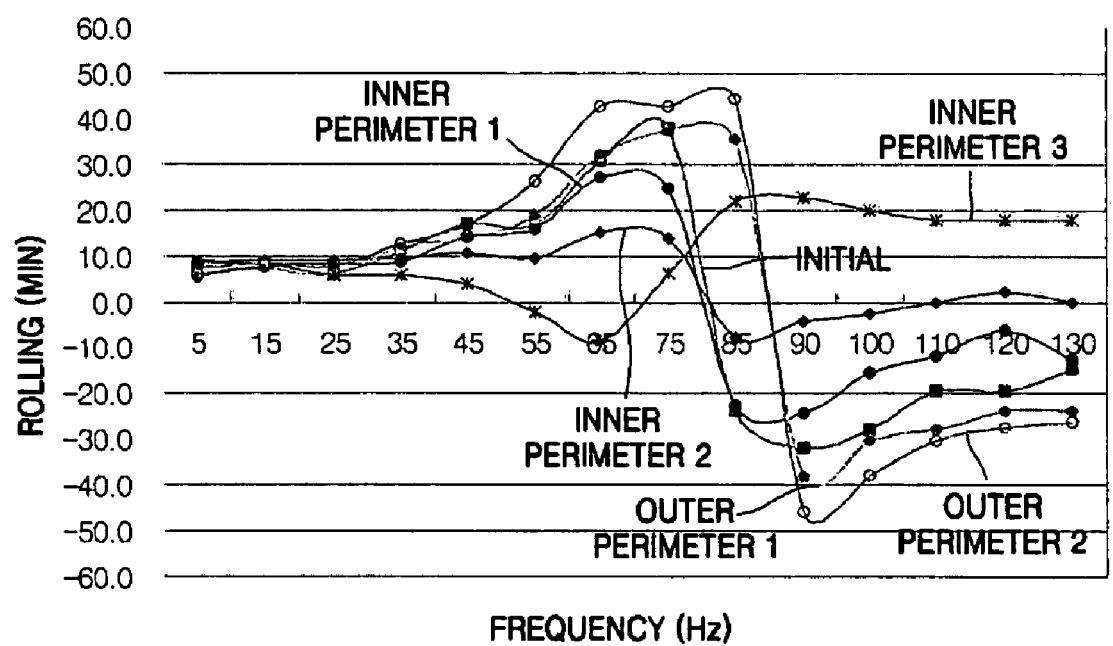

FIGS. 8 and 9 illustrate the amounts of radial rolling measured on one set of actuators for BD and another set of actuators for BD with differences in mass distribution in a radial rolling direction. FIGS. 8 and 9 show the amounts of radial rolling measured when the objective lens 110 moves toward the optical disc D by 0.4 mm from a reference position.

FIG. 8 shows changes in the direction and magnitude of radial rolling at each focusing driving frequency in an initial state ("initial"), when a mass of 0.03 g is added once on the inner perimeter of a blade ("inner perimeter 1"), when a mass of 0.03 g is added twice on the inner perimeter thereof ("inner perimeter 2"), when a mass of 0.03 g is added once on the outer perimeter ("outer perimeter 1"), and when a mass of 0.03 g is added twice on the outer perimeter ("outer perimeter 2"). As is clearly evident from FIG. 8, the direction and magnitude of radial rolling may vary by adding load masses on the inner or outer perimeter of the blade.

The sign of radial rolling is reversed with respect to the radial rolling frequency. In FIG. 8, the radial rolling frequency is about 80 Hz. Since even a small amount of moment may amplify the angle of rolling in a rolling frequency band, in an embodiment of the invention, the optical pickup actuator has a radial rolling frequency that is higher than a focusing driving frequency.

Since the direction and magnitude of radial rolling may vary by adjusting a mass unbalance as shown in FIG. 8, the optical pickup actuator may obtain the desired rolling characteristics by adding or subtracting an appropriate amount of mass while checking the direction or magnitude of radial rolling in the movable part 171 for each focusing driving frequency.

FIG. 9 shows changes in the direction and magnitude of radial rolling for each number of rotation in an initial state ("initial"), when a mass of 0.03 g is added once on the inner perimeter of a blade ("inner perimeter 1"), when a mass of 0.03 g is added twice on the inner perimeter thereof ("inner perimeter 2"), when a mass of 0.03 g is added three times on the inner perimeter thereof ("inner perimeter 3"), when a mass of 0.03 g is added once on the outer perimeter ("outer perimeter 1"), and when a mass of 0.03 g is added twice on the outer perimeter ("outer perimeter 2"). In FIG. 9, the initial radial rolling frequency is about 80 Hz. As is clearly evident from FIG. 9, the direction and magnitude of radial rolling may vary by adding load masses on the inner and/or outer perimeter of the blade, and radial rolling frequency may also be moved to a higher frequency band.

Referring to FIG. 9, radial rolling frequency in the case of inner perimeter 1, inner perimeter 2, and inner perimeter 3 is almost similar to the initial rolling frequency. While the direction of radial rolling is equal to the initial rolling direction but the magnitude of radial rolling is different from the initial rolling magnitude in the case of the inner perimeter 1 and inner perimeter 2, the direction of radial rolling is opposite to the initial direction in the case of inner perimeter 3.

In the case of outer perimeter 1 and outer perimeter 2, the directions of radial rolling are equal to the initial rolling direction while the magnitude and frequencies of radial rolling are greater than the initial magnitude and frequency. While the initial radial rolling frequency is about 80 Hz, the radial rolling frequencies in the case of outer perimeter 1 and the outer perimeter 2 increase to about 90 Hz.

The direction and magnitude of the radial rolling may vary and the radial rolling frequency may be increased by adding masses on the inner and/or outer perimeters of the blade, as demonstrated in FIG. 9.

FIGS. 8 and 9 show the results of experiments conducted using the optical pickup actuators with an initial radial rolling frequency of about 80 Hz that are owned by the inventor of the present invention so as to verify that the magnitude and direction of radial rolling vary by adding masses in a high frequency band. While the experiments shown in FIGS. 8 and 9 use optical pickup actuators having the initial rolling frequency of 80 Hz for convenience of explanation, that the direction and magnitude of radial rolling may be adjusted according to the same principles as above when the optical pickup actuator has a high rolling frequency of about 100 Hz will be readily apparent.

As is evident from FIGS. 8 and 9, the direction and magnitude of radial rolling may be controlled by adjusting a mass unbalance.

More specifically, a voltage (or current) applied to drive the movable part 171 in the focus direction is measured while moving the center of weight with respect to the center of the objective lens 110 in a radial direction by adding or subtracting the masses 190 and 195, for example, using adhesive, in a high frequency band. Then, by checking the direction and magnitude of radial rolling of each focusing driving frequency using a tilt angle of the movable part 171, as measured by a tilt sensor, a mass unbalance is adjusted to induce the radial rolling that causes the optical axis of the objective lens 110 to be nearly perpendicular to the recording surface of the optical disc D during a focusing operation in a high frequency band.

Figure 10:
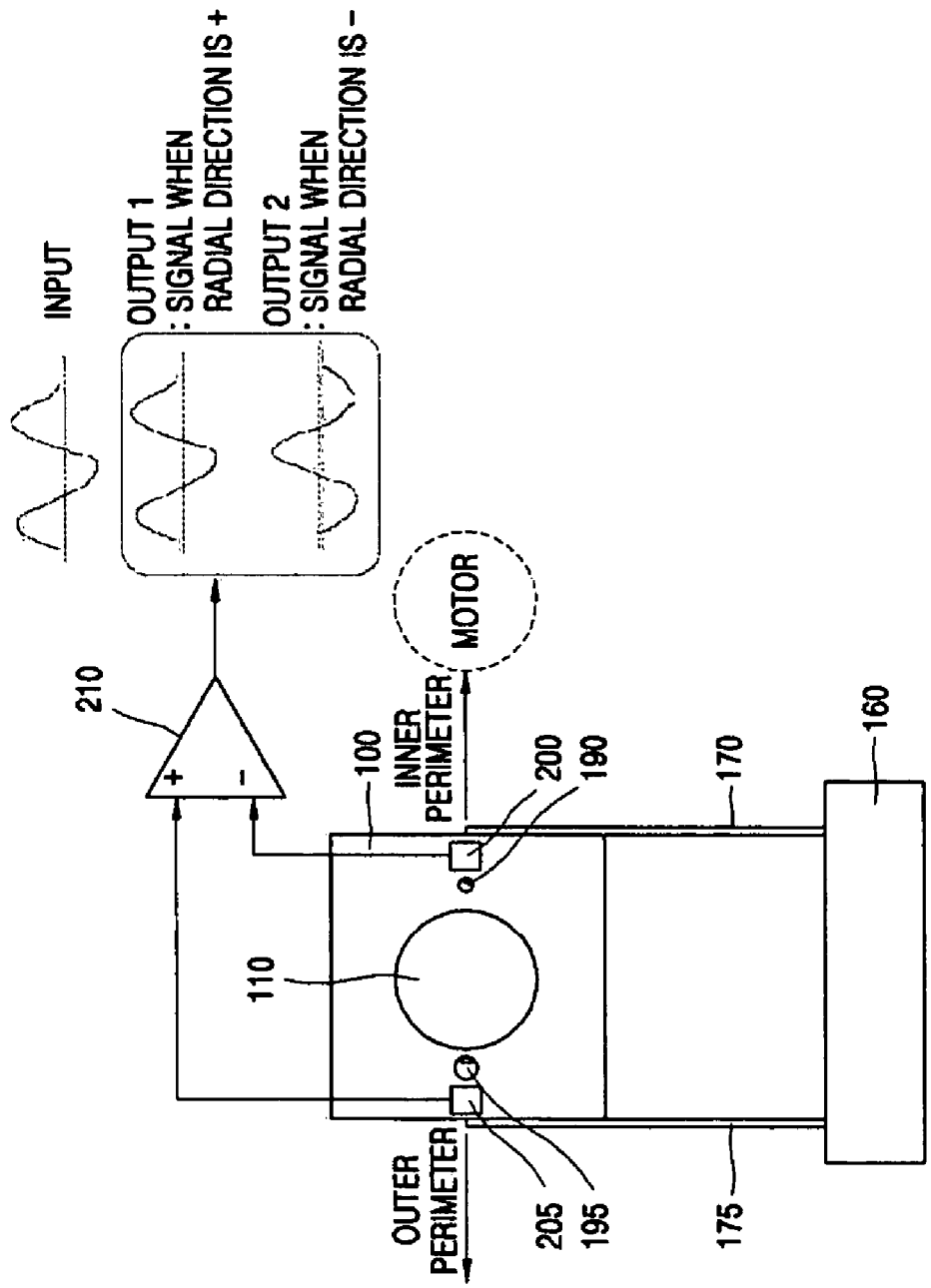
FIG. 10 shows an example in which a tilt sensor to measure the tilt angle of a movable part is installed on a blade and a tilt signal detected by the tilt sensor.

FIG. 10 shows an example in which a pair of tilt sensors 200 and 205 to measure the tilt angle of a movable part 171 is disposed on a blade 100 and in which a tilt signal is detected by at least one of the pair of the tilt sensors 200 and 205. Referring to FIG. 10, the pair of tilt sensors 200 and 205 are symmetric about the center of the objective lens 110 and are disposed on either side of the blade 100 in the radial direction of the disc D. A differential amplifier 210 uses the difference between signals detected by the pair of tilt sensors 200 and 205 to output a differential signal that is representative of a tilt signal.

An input signal represents a voltage signal being applied to move the movable part 171 in the focus direction. Output signal 1 or output signal 2 represents a tilt signal output from the differential amplifier 210. Assuming that the applied voltage signal has a positive (+) value when the optical pickup actuator moves toward the optical disc D, the output signal 1 is a tilt signal when radial rolling is in the positive (+) direction while the output signal 2 is a tilt signal when radial rolling is in the negative (−) direction.

When a mass unbalance is adjusted to induce radial rolling so that the optical axis of the objective lens 110 is almost perpendicular to the recording surface of the optical disc D during a focusing operation in a high frequency band, a tilt signal corresponding to the output signal 1 is detected when the movable part 171 of the optical pickup actuator is driven in the focus direction according to the applied voltage signal shown in FIG. 10.

Thus, when the objective lens 110 is moved toward the optical disc D with respect to a reference position, the optical pickup actuator is able to achieve the type A radial rolling characteristics by adjusting a mass unbalance (i.e., center of weight of the movable part 171) until radial rolling in the positive (+) direction occurs while checking a radial rolling direction for each focusing driving frequency using a tilt signal detected by the tilt sensors 190 and 195.

Here, if radial rolling is in the (+) direction when the objective lens 110 moves toward the optical disc with respect to the reference position, radial rolling is in the (−) direction when the objective lens 110 moves in the reverse direction.

Meanwhile, the difference $I_s$ between the center of force of the movable part 171 and the center of the suspensions 170 and 175 in the numerator of Equation (2) also affects the amount of radial rolling. As shown in FIG. 7, the amount of radial rolling remains almost unchanged despite an increase in the focusing driving frequency in a low frequency region (dc tilt interval). Therefore, to achieve the desired rolling in a low frequency band, an adjustment of the difference $l_s$ between the center of force of the movable part 171 and the center of the suspensions 170 and 175 is necessary.

As is described above, adjusting the difference $l_s$ may be achieved by making the stiffness of the inner suspensions 170 higher than that of the outer suspensions 175. Thus, the optical pickup actuator according to the present invention may achieve the type A rolling characteristics in a low frequency band as well.

That is, by adjusting a mass unbalance, the optical pickup actuator of the present invention may achieve radial rolling (see FIGS. 12A-12C) in which the optical axis of the objective lens 110 is nearly perpendicular to the recording surface of the optical disc D during a focusing operation in a high frequency region. Furthermore, the optical pickup actuator according to the present invention may induce the same type radial rolling (see FIGS. 12A-12C) during a focusing operation in a low frequency region by making the stiffness of the inner suspensions 170 higher than that of the outer suspensions 175.

The optical pickup actuator according to the present invention may have a high radial rolling frequency, i.e., 100 Hz, in an embodiment of the invention, and a radial rolling tile of less than 0.3° that causes the optical axis of the objective lens 110 to be almost perpendicular to the recording surface of the optical disc D during focusing operation in bands ranging from a low frequency band to a high frequency band.

Figure 11:
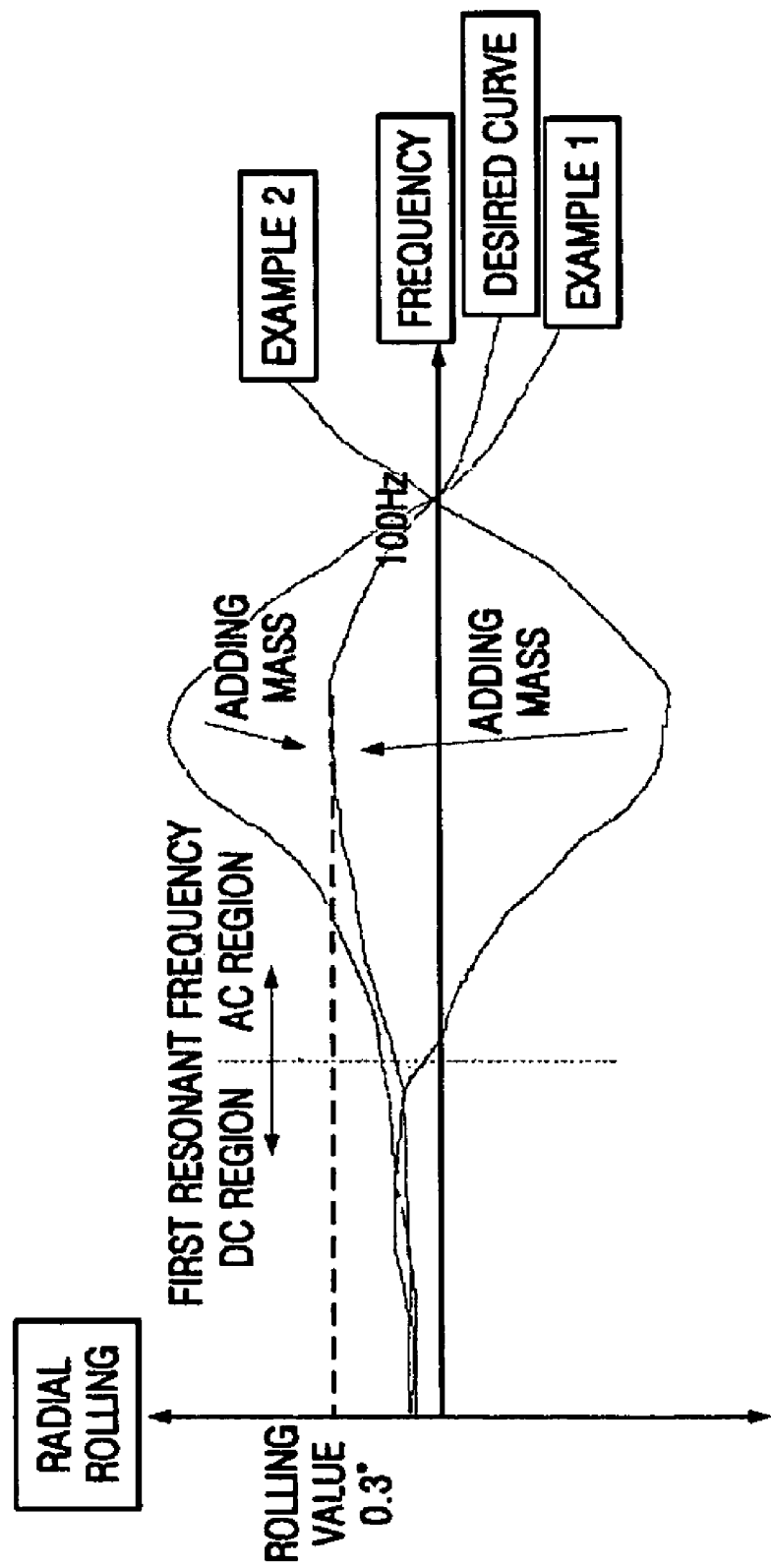
FIG. 11 illustrates the optimization of rolling characteristics of optical pickup actuators according to Example 1 and Example 2 respectively exhibiting (−) and (+) radial rolling in a frequency region below a rolling frequency when a movable part moves toward an optical disc D.

FIG. 11 illustrates the optimization of rolling characteristics of optical pickup actuators according to Example 1 and Example 2 respectively exhibiting (−) and (+) radial rolling in a frequency region below a rolling frequency when a movable part 171 moves toward an optical disc D. As illustrated in FIG. 11, a radial rolling amount of less than 0.3° may be obtained by adjusting a mass unbalance of the optical pickup actuators according to Example 1 and Example 2.

The optical pickup actuator according to the present invention may achieve the type A radial rolling using a difference in mass distribution in a frequency band above the first resonant frequency (e.g. 50 to 90 Hz). On the other hand, the optical pickup actuator according to the present invention may induce the type A radial rolling in a frequency band below the first resonant frequency (e.g. 0 to 50 Hz) using a stiffness difference between the inner and outer suspensions 170 and 175. Since determining the magnitude and direction of radial rolling at a frequency above 100 Hz is not relatively important, due to a decrease in surface vibration amount as the number of rotations of the optical disc D increases, the optical pickup actuator of the present invention may also perform a focusing operation at a frequency higher than 100 Hz.

The operation of the optical pickup actuator constructed above will now be described.

When current flows through the focusing coil 131 and/or the tracking coils 132, the blade 100 is driven in a focusing direction A and/or a tracking direction B, respectively, by an electromagnetic force generated by an interaction between the coils 131 and 132 and the magnetic field of the magnets 140. When the blade 100 is driven in the focusing direction A, the direction of vertical movement of the blade 100 is determined by the direction of the current flowing through the focusing coil 131. Likewise, the direction of horizontal movement of the blade 100 is determined by the direction of current flowing through the tracking coils 132. In this case, the internal yokes 155 not only serve to guide the blade 100 during a focusing or tracking operation of the movable part 171 but also form a magnetic path together with the external yokes 150. The focusing and/or tracking operations of the movable part 171 allow a beam passing through the objective lens 110 to be properly focused on the optical disc D so as to enable information to be recorded on and/or read from the disc D.

In this case, the movable part 171 including the blade 100 is supported movably by the suspensions 170 and 175 to perform a focusing operation. During the focusing operation, radial rolling selectively occurs in which the optical axis of the objective lens 110 is almost perpendicular to the recording surface of the optical disc D.

Figure 12A:
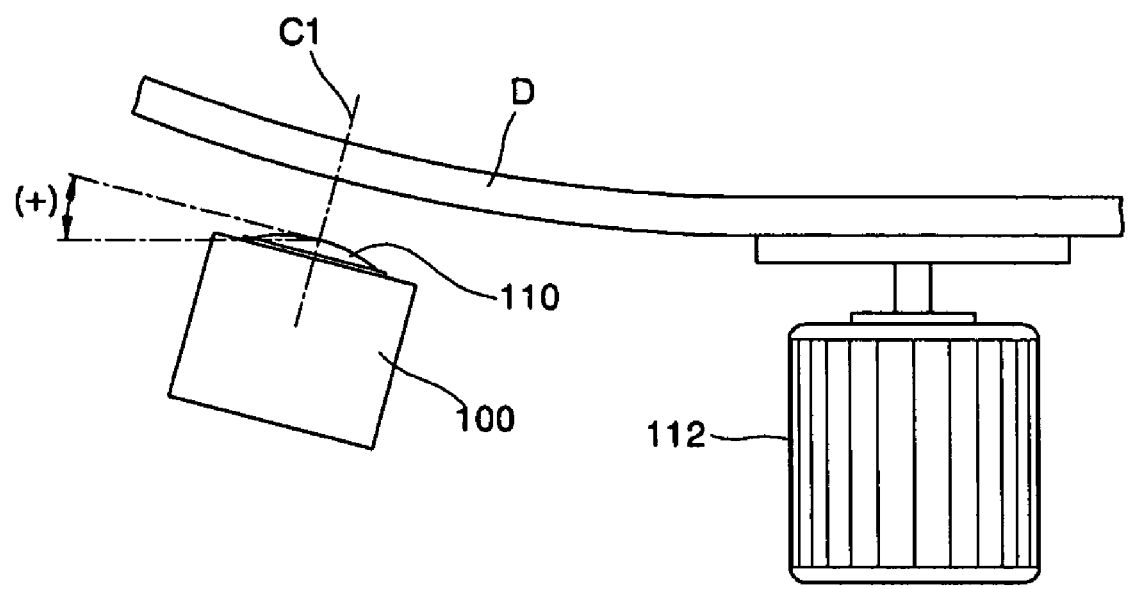
FIGS. 12A-12C illustrate the effects of the optical pickup actuator according to the present invention.
Figure 12B:
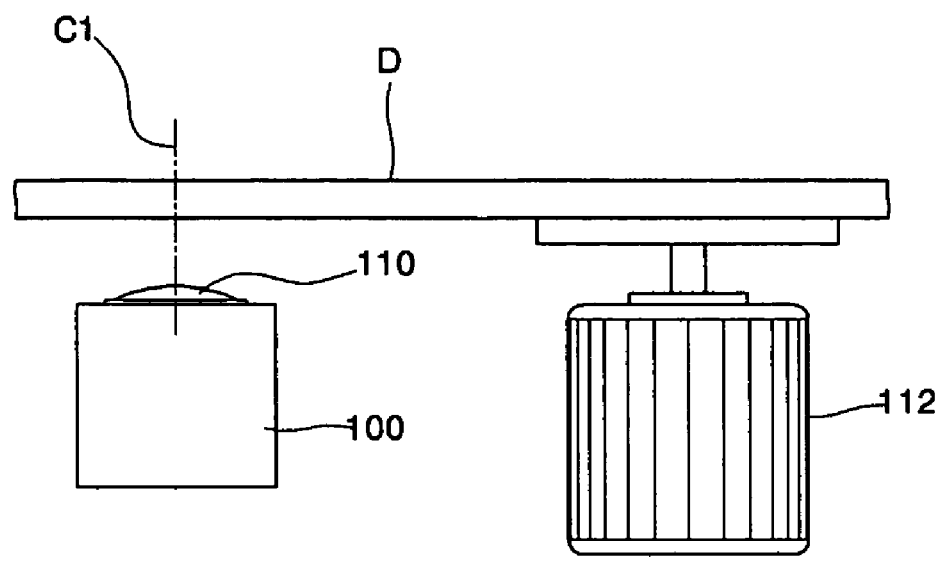
Figure 12C:
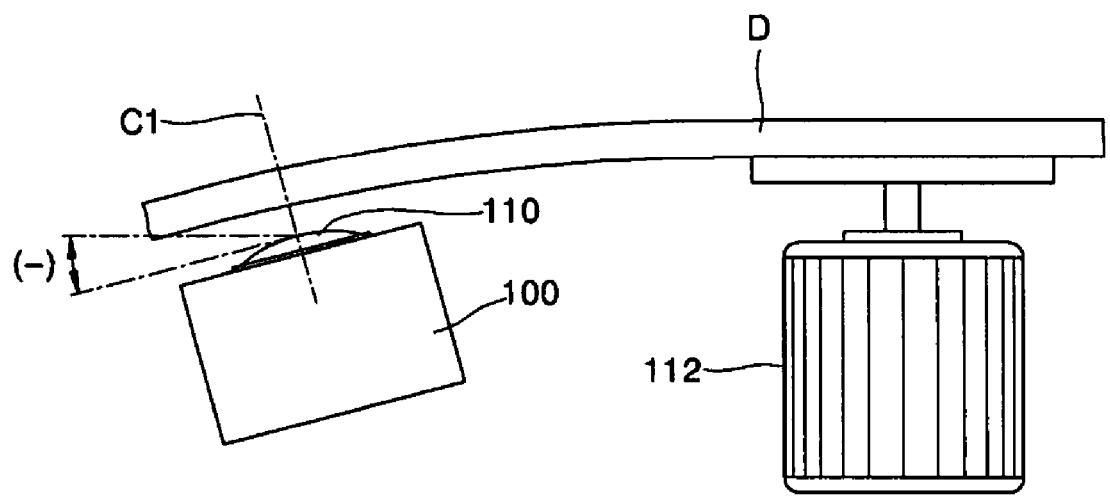

More specifically, when the outer perimeter of the optical disc D is curved upward as shown in FIG. 12A, the blade 100 moves upward so that radial rolling is in the (+) direction. The radial rolling causes the optical axis of the objective lens 110 to be perpendicular to the recording surface of the optical disc D so as to enable precise focusing on the recording surface. Reference numeral 112 denotes a motor rotating the optical disc D. When the optical disc D has a flat surface without a deflection error as shown in FIG. 12B, the blade 100 ascends without being tilted to allow focusing on the recording surface. When the outer perimeter of the optical disc D is curved downward as shown in FIG. 12C, the blade 100 moves downward so that radial rolling is in the (−) direction. The (−) radial rolling causes the optical axis of the objective lens 110 to be perpendicular to the recording surface of the optical disc D, thereby enabling precise focusing on the recording surface. The optical pickup actuator according to the present invention achieves one of radial rolling shown in FIGS. 12A-12C during focusing operation at any frequency in bands ranging from a low frequency band to a high frequency band (e.g., 100 Hz).

In this way, the optical pickup actuator according to the present invention may reduce a deflection error resulting from the curvature of the optical disc D so as to provide improved adaptability to an optical disc with a deflection error. Furthermore, an optical pickup including the optical pickup actuator provides improved adaptability to the deflection error of the optical disc D so as to enable a beam passing through the objective lens 110 to be focused precisely on the disc D.

Figure 13:
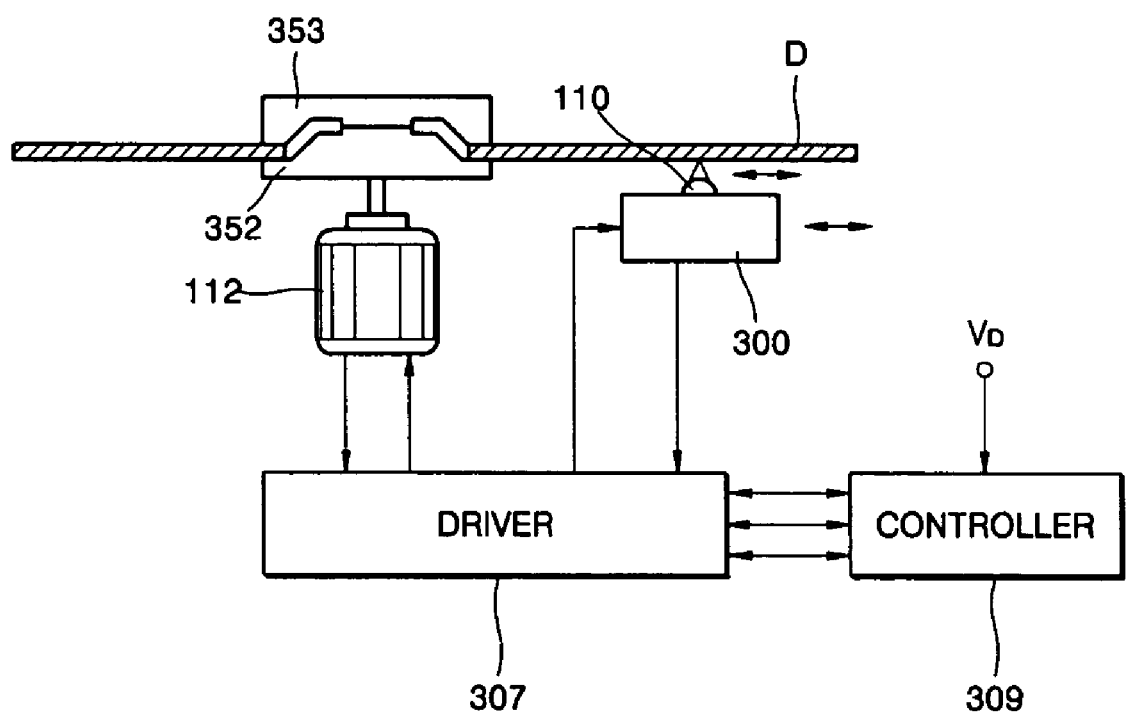
FIG. 13 is a schematic diagram showing the construction of an optical recording and/or reproducing apparatus including an optical pickup actuator according to the present invention.

FIG. 13 is a schematic diagram showing the construction of an optical recording and/or reproducing apparatus including an optical pickup actuator according to the present invention.

Referring to FIG. 13, an optical recording and/or reproducing apparatus according to the present invention includes a spindle motor 112 rotating an optical disc D, an optical pickup 300 that is movably installed in a radial direction of the optical disc D and reproduces and/or records information from/on the optical disc D, a driver 307 driving the spindle motor 112 and the optical pickup 300, and a controller 309 controlling focusing, tracking, and/or tilt servos of the optical pickup 300. Here, reference numerals 352 and 353 denote a turntable and a clamp for chucking the optical disc D, respectively.

The optical pickup 300 includes an optical system with an objective lens 110 focusing a beam emitted by a light source onto the optical disc D and an optical pickup actuator driving the objective lens 110. The optical pickup actuator according to the present invention may be used as the optical pickup actuator.

A beam, reflected from the optical disc D, is detected by a photodetector mounted in the optical pickup 300 and is photoelectrically converted into an electrical signal that is then input to the controller 309 through the driver 307. The driver 307 controls the rotation speed of the spindle motor 112, amplifies the input signal, and drives the optical pickup 300. The controller 309 sends focus servo and tracking servo commands, which have been adjusted based on the signal received from the driver 307, back to the driver 457 so that the optical pickup can perform focusing and tracking operations.

The present invention achieves radial rolling that causes the optical axis of an objective lens to be nearly perpendicular to the recording surface of an optical disc during a focusing operation of an optical pickup actuator up to a high frequency band above the first resonant frequency so as to improve adaptability to the optical disc with a deflection error in a high-speed optical recording and/or reproducing apparatus.

The present invention also provides improved adaptability to the optical disc with a deflection error during focusing operation in bands ranging from a frequency band below the first resonant frequency of the optical pickup actuator to a frequency band above the same frequency by making the stiffness of inner suspensions higher than that of outer suspensions.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup actuator comprising:
a blade supported by a plurality of suspensions to be movable with respect to a base and on which an objective lens is mounted; and
a magnetic circuit to drive a movable part, the movable part including the blade,
wherein the movable part comprises a weight center adjusting element to induce radial rolling in a direction in which an optical axis of the objective lens is perpendicular to an information storage surface of an information storage medium during a focusing operation in a high frequency band above the first resonant frequency of the optical pickup actuator.

2. The actuator of claim 1, wherein the element is a mass being added to or subtracted from at least one of the inner or outer perimeters of the movable part with respect to the center of the objective lens in the radial direction of the information storage medium.

3. The actuator of claim 2, wherein the mass is added to or subtracted from the blade.

4. The actuator of claim 2, wherein the mass is obtained by attaching an adhesive to the blade.

5. The actuator of claim 2, wherein the plurality of suspensions and the movable part induce radial rolling during a focusing operation up to at least 100 Hz such that the optical axis of the objective lens is perpendicular to the information storage surface of the information storage medium.

6. The actuator of claim 5, wherein the actuator is formed to have a rolling frequency of 100 Hz or greater.

7. The actuator of claim 1, wherein the plurality of suspensions and the movable part induce radial rolling such that the optical axis of the objective lens is perpendicular to the information storage surface of the information storage medium during a focusing operation up to at least 100 Hz.

8. The actuator of claim 7, wherein the actuator is formed to have a rolling frequency of 100 Hz or greater.

9. The actuator of claim 1, wherein the plurality of suspensions include inner suspensions and outer suspensions about the center of the objective lens and respectively positioned in the inner and outer perimeters of the optical disc in a radial direction, wherein the inner suspensions have a higher stiffness than the outer suspensions.

10. The actuator of claim 9, wherein the plurality of suspensions and the movable part induce radial rolling such that the optical axis of the objective lens is perpendicular to the information storage of the information storage medium during a focusing operation in frequency bands ranging from a low frequency band below 1 Hz to at least 100 Hz.

11. An optical recording and/or reproducing apparatus including the actuator of claim 1 driving an objective lens, an optical pickup that is movably installed in a radial direction of an information storage medium and reproduces and/or records information from/on the information storage medium, and a controller controlling the optical pickup.

12. The apparatus of claim 11, wherein the element is a mass added or subtracted on at least one of the inner or outer perimeters of the movable part about the center of the objective lens in the radial direction of the information storage medium.

13. The apparatus of claim 12, wherein the mass is added or subtracted on the blade.

14. The apparatus of claim 12, wherein the mass is added or subtracted by attaching an adhesive on the blade in order to adjust the center of weight of the movable part.

15. The apparatus of claim 11, wherein the plurality of suspensions and the movable part induce radial rolling during a focusing operation up to at least 100 Hz such that the optical axis of the objective lens is perpendicular to the information storage surface of the information storage medium.

16. The apparatus of claim 15, wherein the actuator is formed to have a rolling frequency of 100 Hz or greater.

17. The apparatus of claim 11, wherein the plurality of suspensions include inner suspensions and outer suspensions about the center of the objective lens and respectively positioned in the inner and outer perimeters of the optical disc in a radial direction, wherein the inner suspensions have a higher stiffness than the outer suspensions.

18. The apparatus of claim 17, wherein the plurality of suspensions and the movable part induce radial rolling such that the optical axis of the objective lens is perpendicular to the information storage of the information storage medium during a focusing operation in frequency bands ranging from a low frequency band below 1 Hz to at least 100 Hz.

19. A method of manufacturing an optical pickup actuator including a blade, supported by a plurality of suspensions to be movable with respect to a base and on which an objective lens is mounted, and a magnetic circuit to drive a movable part including the blade, the method comprising:
checking the direction of radial rolling for each focusing driving frequency; and
adjusting the center of weight of the movable part when the direction of radial rolling is not the desired direction, wherein the center of weight of the movable part is adjusted until radial rolling is induced in a direction in which an optical axis of the objective lens is perpendicular to an information storage surface of an information storage medium.

20. The method of claim 19, wherein the center of weight of the movable part is adjusted by adding or subtracting a mass on at least one of the inner or outer perimeters of the movable part about the center of the objective lens in the radial direction of the optical disc.

21. The method of claim 20, wherein the mass is added or subtracted on the blade.

22. The method of claim 20, wherein the mass is added or subtracted by adding or subtracting an adhesive on the blade in order to adjust the center of weight of the movable part.

23. The method of claim 19, wherein the center of weight of the movable part is adjusted to induce radial rolling in a focusing driving frequency range of at least 100 Hz in a direction in which the optical axis of the objective lens is perpendicular to the information storage surface of the information storage medium.

24. The method of claim 23, wherein the actuator has a rolling frequency of 100 Hz or greater.

25. An optical pickup comprising the optical pickup actuator of claim 1.

26. The pickup of claim 25, wherein the element is a mass being added or subtracted on at least one of the inner or outer perimeters of the movable part with respect to the center of the objective lens in the radial direction of the information storage medium.

27. The pickup of claim 26, wherein the mass is added or subtracted on the blade.

28. The pickup of claim 26, wherein the mass is obtained by adding an adhesive to or removing an adhesive from the blade.

29. The pickup of claim 25, wherein the plurality of suspensions and the movable part induce radial rolling during a focusing operation up to at least 100 Hz such that the optical axis of the objective lens is perpendicular to the information storage surface of the information storage medium.

30. The pickup of claim 29, wherein the actuator has a rolling frequency of 100 Hz or greater.

31. The pickup of claim 25, wherein the plurality of suspensions and the movable part induce radial rolling such that the optical axis of the objective lens is perpendicular to the information storage surface of the information storage medium during a focusing operation up to at least 100 Hz.

32. The pickup of claim 31, wherein the actuator is formed to have a rolling frequency of 100 Hz or greater.

33. The pickup of claim 25, wherein the plurality of suspensions include inner suspensions and outer suspensions about the center of the objective lens and respectively positioned in the inner and outer perimeters of the optical disc in a radial direction, wherein the inner suspensions have a higher stiffness than the outer suspensions.

34. The pickup of claim 33, wherein the plurality of suspensions and the movable part induce radial rolling such that the optical axis of the objective lens is perpendicular to the information storage of the information storage medium during a focusing operation in frequency bands ranging from a low frequency band below 1 Hz to at least 100 Hz.

35. An optical pickup comprising the optical pickup actuator manufactured according to the method of claim 19.

36. The pickup of claim 35, wherein the center of weight of the movable part is adjusted by adding or subtracting a mass on at least one of the inner and outer perimeters of the movable part about the center of the objective lens in the radial direction of the optical disc.

37. The pickup of claim 36, wherein the mass is added or subtracted on the blade.

38. The pickup of claim 36, wherein the mass is added or subtracted by adding or subtracting an adhesive on the blade in order to adjust the center of weight of the movable part.

39. The pickup of claim 35, wherein the center of weight of the movable part is adjusted to induce radial rolling in a focusing driving frequency range of at least 100 Hz in a direction in which the optical axis of the objective lens is perpendicular to the information storage surface of the information storage medium.

40. The pickup of claim 39, wherein the actuator is formed to have a rolling frequency of 100 Hz or greater.

41. An optical recording and/or reproducing apparatus including the actuator of claim 19 driving an objective lens, an optical pickup that is movably installed in a radial direction of an information storage medium and reproduces and/or records information from/on the information storage medium, and a controller controlling the optical pickup.

42. The apparatus of claim 41, wherein the center of weight of the movable part is adjusted by adding or subtracting a mass on at least one of the inner and outer perimeters of the movable part about the center of the objective lens in the radial direction of the optical disc.

43. The apparatus of claim 42, wherein the mass is added or subtracted on the blade.

44. The apparatus of claim 42, wherein the mass is added or subtracted by adding an adhesive to or removing an adhesive from the blade in order to adjust the center of weight of the movable part.

45. The apparatus of claim 41, wherein the center of weight of the movable part is adjusted to induce radial rolling in a focusing frequency range of at least 100 Hz in a direction in which the optical axis of the objective lens is perpendicular to the information storage surface of the information storage medium.

46. The apparatus of claim 45, wherein the actuator is formed to have a rolling frequency of 100 Hz or greater.

47. An actuator including a holder positioned on a base, a movable part supported by inner and outer suspensions to be movable with respect to the base and to be tilted according to a focal height variation of a bending optical disc and such that the optical axis of an objective lens on the movable part is substantially perpendicular to a recording surface of the optical disc, and a magnetic circuit to drive the movable part, the movable part comprising:

a blade to mount the objective lens; and weight center adjusting elements on the blade to induce radial rolling during focusing operations at frequencies that are higher than a predetermined resonant frequency of the actuator such that the perpendicularity of the optical axis of the objective lens relative to the recording surface is maintained.

48. The actuator according to claim 47, wherein the weight center adjusting elements adjust a mass unbalance in the movable part.

49. The actuator according to claim 47, wherein the inner suspensions have a higher stiffness than the outer suspensions.

50. The actuator according to claim 47, wherein the actuator adapts to the bending optical disk during focusing operations in frequency bands ranging from a low frequency band below 1 Hz to higher frequency bands around 200 Hz.

51. The actuator according to claim 47, wherein increasing a stiffness of each of the suspensions increases a radial rolling frequency.

52. The actuator according to claim 47, wherein increasing a difference between a center of force of the movable part and a center of the suspensions increases a radial rolling frequency.

53. The actuator according to claim 47, wherein increasing a difference between a center of force of the movable part and a center of the suspensions increases a radial rolling frequency.

54. The actuator according to claim 47, wherein the actuator rolling frequency is approximately 100 Hz.

55. The actuator according to claim 47, wherein a rolling frequency of the actuator is lower than or higher than 100 Hz, if necessary, as long as the rolling frequency is higher than a required focusing frequency.

56. The actuator according to claim 47, wherein a direction and a magnitude of the radial rolling may vary and wherein a radial rolling frequency is increased by adding masses on the inner and/or outer perimeters of the blade.

57. The actuator according to claim 47, wherein a direction and a magnitude of the radial rolling may vary and wherein a radial rolling frequency is controlled by adjusting a mass unbalance on the blade.

* * * * *

UNITED STATES PATENT AND TRADEMARK OFFICE
CERTIFICATE OF CORRECTION

PATENT NO. : 7,577,968 B2 Page 1 of 1
APPLICATION NO. : 11/154808
DATED : August 18, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Fourteenth Day of December, 2010

David J. Kappos
*Director of the United States Patent and Trademark Office*